United States Patent [19]
Katoku et al.

[11] Patent Number: 5,790,349
[45] Date of Patent: Aug. 4, 1998

[54] ROTARY HEAD DEVICE

[75] Inventors: Takashi Katoku; Toshihiro Kusunoki, both of Tokyo, Japan

[73] Assignee: Sony Corporation, Tokyo, Japan

[21] Appl. No.: 636,399

[22] Filed: Apr. 23, 1996

[30] Foreign Application Priority Data

Apr. 28, 1995 [JP] Japan ................................. 7-128977

[51] Int. Cl.$^6$ ........................................... G11B 5/52
[52] U.S. Cl. ............................................ 360/107
[58] Field of Search ...................... 360/84, 85, 107, 360/130.24

[56] References Cited

U.S. PATENT DOCUMENTS

| | | | |
|---|---|---|---|
| 4,165,523 | 8/1979 | Hathaway | 360/107 |
| 4,366,516 | 12/1982 | Ogata et al. | 360/84 |
| 4,844,839 | 7/1989 | Tsubota et al. | 360/84 |
| 5,130,875 | 7/1992 | Ono et al. | 360/107 |
| 5,270,890 | 12/1993 | Katou et al. | 360/84 |
| 5,299,084 | 3/1994 | Falk et al. | 360/107 |
| 5,528,438 | 6/1996 | Tanaka et al. | 360/84 |

FOREIGN PATENT DOCUMENTS

| | | |
|---|---|---|
| 0182348 | 5/1986 | European Pat. Off. . |
| 0383588 | 8/1990 | European Pat. Off. . |
| 59-063046 | 4/1984 | Japan ........................................ 360/84 |

Primary Examiner—Stuart S. Levy
Assistant Examiner—David D. Davis
Attorney, Agent, or Firm—Jay H. Maioli

[57] ABSTRACT

The rotary head device for recording and/or regenerating signals so as to form a plurality of inclined tracks parallel each other along the longitudinal direction of each recording region on and/or from a tape recording medium such as magnetic tape having two recording regions divided along the longitudinal direction of the tape recording medium has a rotation drum, rotationally driving means, and the first and second head components. The tape recording medium is wound around the rotation drum with a prescribed angle. The rotation drum is rotated by the rotationally driving means. The first head component is provided on any one side of top and bottom sides of the rotation drum. The first head component involves recording and/or regeneration of signals of one region of the two recording regions of the tape recording medium. The second head component is mounted on the other side of the top and bottom sides of the rotation drum and at the angularly different position apart from the first head component in the peripheral direction of the rotation drum. The second head component involves recording and/or regeneration of signals of the other region of the two recording regions of the tape recording medium.

8 Claims, 6 Drawing Sheets

FIG. I
(PRIOR ART)

ROTARY HEAD DEVICE

BACKGROUND

1. Field of the Invention

This invention relates to a rotary head device. Particularly the invention relates to a rotary head device for forming inclined tracks on a tape recording medium by moving the tape recording medium in forward direction and reverse direction.

2. Background of the Invention

Various magnetic recorders and/or regenerators for recording and/or regenerating digital audio signals on and/or from a magnetic tape as the tape recording medium using a rotary head comprising a drum provided with a plurality of heads. In recorders and/or regenerators for recording and/or regenerating using a rotary head, a magnetic tape is wound on a driven rotation drum with a prescribed angle and the drum is rotated at a prescribed speed, thereby, input digital audio signals are recorded on inclined tracks on a magnetic tape by the head. For regenerating, heads of a drum scans tracks on a magnetic tape, thereby, recorded signals are read out.

As an example of such magnetic recorders and/or regenerators, U.S. Pat. No. 4,665,443 discloses a magnetic recorder and/or regenerator. In the device disclosed in U.S. Pat. No. 4,665,443, the recording region of a magnetic tape is divided to two regions along the longitudinal direction, while a magnetic tape is moved in the forward direction, signals are recorded on and/or regenerated from one region of the two recording regions. On the other hand, while a magnetic tape is moved in the reverse direction, signals are recorded on and/or regenerated from the other region of the magnetic tape by the head.

The structure of a rotary head device used for such recording and/or regeneration is shown in FIG. 1.

The rotary head device "a" is provided with a bottom drum "c" and top drum "d" fixed on a chassis "b", and a medium drum "e" which is a rotation drum provided rotatably between the drums "c" and "d".

On the top side of the rotation drum "e", magnetic heads "f" and "f" (referred as to A-side head) for recording and/or regenerating input signals such as digital audio signals on and/or from the top region of the two recording regions divided along the longitudinal direction of the magnetic tape are mounted. On the bottom side of the rotation drum "e", magnetic heads "g" and "g" (referred to as B-side head) for recording and/or regenerating input signals on and/or from the bottom recording region of the two recording regions are mounted.

A magnetic tape not shown in the figure is moved along the peripheral surface of the head drum "a" by a driving mechanism of the recorder and/or regenerator not shown in the figure. Thereby, the magnetic tape and A-side heads "f" and "f" or B-side heads "g" and "g" are moved relatively, signals are recorded on or regenerated from any one recording region of the two regions divided along the longitudinal direction of the magnetic tape.

Therefore, after signals are recorded on or regenerated from one recording region of the two recording region of the magnetic tape, successively, signals can be recorded on or regenerated from the other recording region of the magnetic tape without the operation of re-attaching of the reversed tape cassette which contains the magnetic tape.

In the case of the rotary head device "a" shown in FIG. 1, A-side heads "f" and "f" and B-side heads "g" and "g" are provided facing each other vertically at the top side and bottom side of the rotation drum "e", consequently, it is difficult to shorten the distance between A side heads "f" and "f" and B side heads "g" and "g". If a rotation drum "e" with a thin thickness is used, the thin thickness results in a reduced rigidity of the rotation drum "e", this is the reason of difficulty to shorten the distance between A-side heads and B-side heads.

Therefore, when a magnetic tape with a wide width is used, the rotary head device shown in FIG. 1 is applicable, however, when a magnetic tape with a narrow width is used, the rotary head device shown in FIG. 1 is difficult to apply. In the case of the rotary head device as shown in FIG. 1, it is difficult to shorten the distance between A-side heads and B-side heads each other in the vertical direction in FIG. 1 by the reason described herein above, therefore, it is difficult to record signals individually on each recording region of two recording regions divided along the longitudinal direction of the magnetic tape. This difficulty is true also for regeneration. In the case of the structure shown in FIG. 2 in which a head drum "j" is placed in a hollow "i" formed on the front side of a tape cassette "h" for recording and/or regenerating, it is almost impossible to apply. The reduction of height or thickness of a whole rotary head device "a" is limited by the reason described herein above, therefore, the rotary head device "a" can not be placed in the hollow "i" of the tape cassette "h" from the opening on the front side of the tape cassette "h".

SUMMARY OF THE INVENTION

It is therefore an object of the present invention to provide a rotary head device which is to resolve the above-mentioned problem.

According to the present invention, a rotary head device is provided. The rotary head device is used to record and/or regenerate signals on and/or from a tape recording medium. The tape recording medium has two recording regions divided along the longitudinal direction of the tape recording medium. The rotary head device forms a plurality of inclined tracks parallel each other along the longitudinal direction of each recording region of the tape recording medium. The rotary head device has a rotation drum, rotationally driving section, and first and second head components. A tape recording medium is wound around the rotation drum. The rotationally driving means rotates the rotation drum. The first head component is mounted on the rotation drum. The first head component is served to record and/or regenerate signals on and/or from one recording region of the two recording regions of the tape recording medium. The second head component is mounted on the rotation drum at the height position different from that of the first head component and at the peripheral position different from that of the first head component. The second head component is served to record and/or regenerate signals on and/or from the other recording region of the two recording regions of the tape recording medium.

DESCRIPTION OF THE INVENTION

Figure 1:
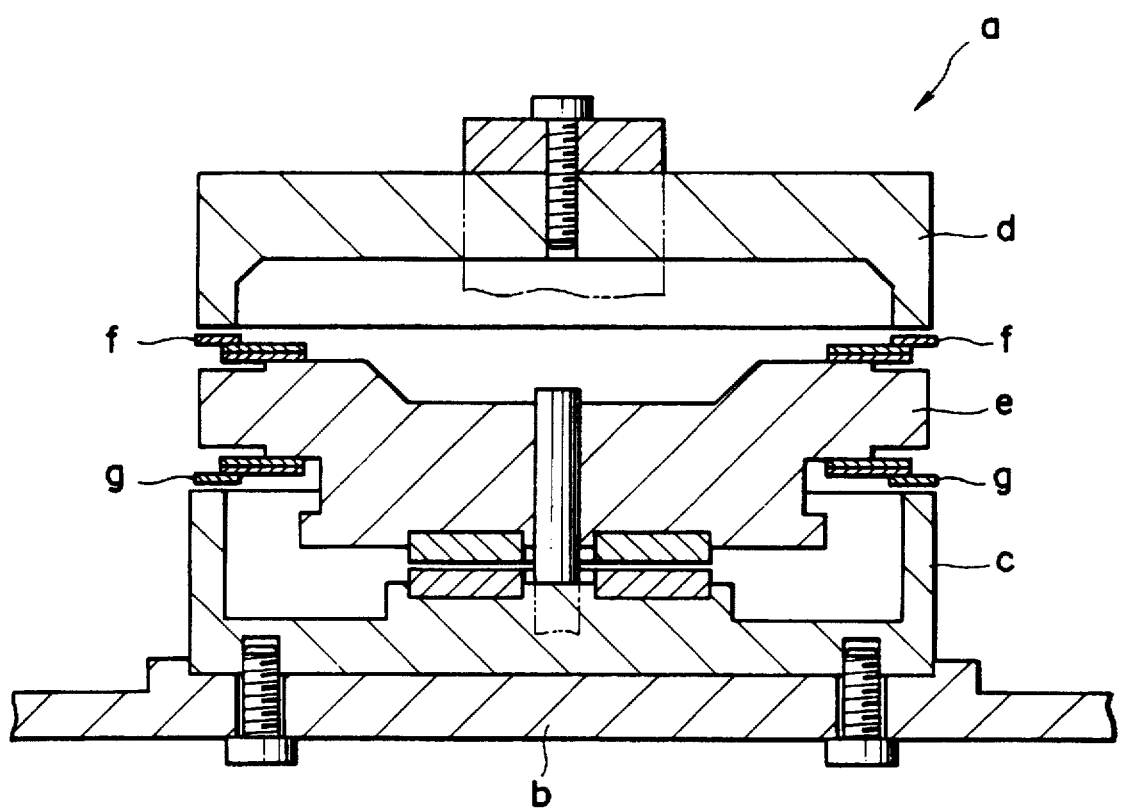
FIG. 1 is a vertical cross-sectional view for illustrating one example structure of a rotary head device.
Figure 2:
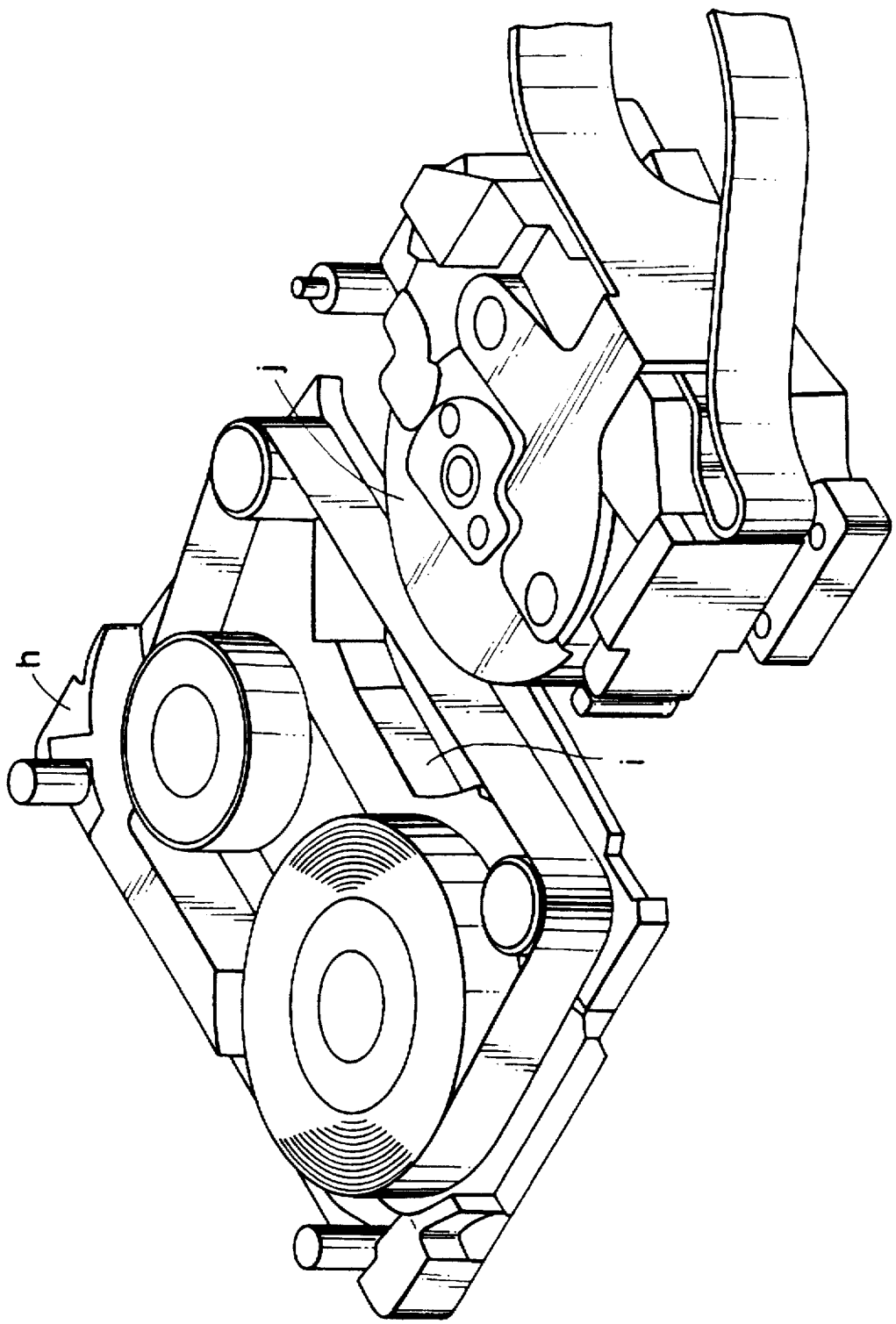
FIG. 2 is a perspective view for illustrating the structure of the main part of the rotary head device of a recorder and/or regenerator using a rotary head device.

The rotary head device in accordance with the embodiment of the present invention will be described in detail hereinafter referring to the drawings. The rotary head device in accordance with the embodiment of the present invention will be described hereinafter referring to a rotary head device used for a magnetic recorder and/or regenerator in which a magnetic tape as a recording medium is moved in any one direction of forward direction and reverse direction as disclosed in the U.S. Pat. No. 4,665,443 described herein above.

Detailed description of signal format is omitted herein, U.S. Pat. No. 4,665,443 may be referred.

By applying a rotary head device in accordance with the present invention, input signals, for example digital audio signals, are recorded on the two recording regions divided along the longitudinal direction of a tape in a form of inclined tracks on the magnetic tape.

Figure 3:
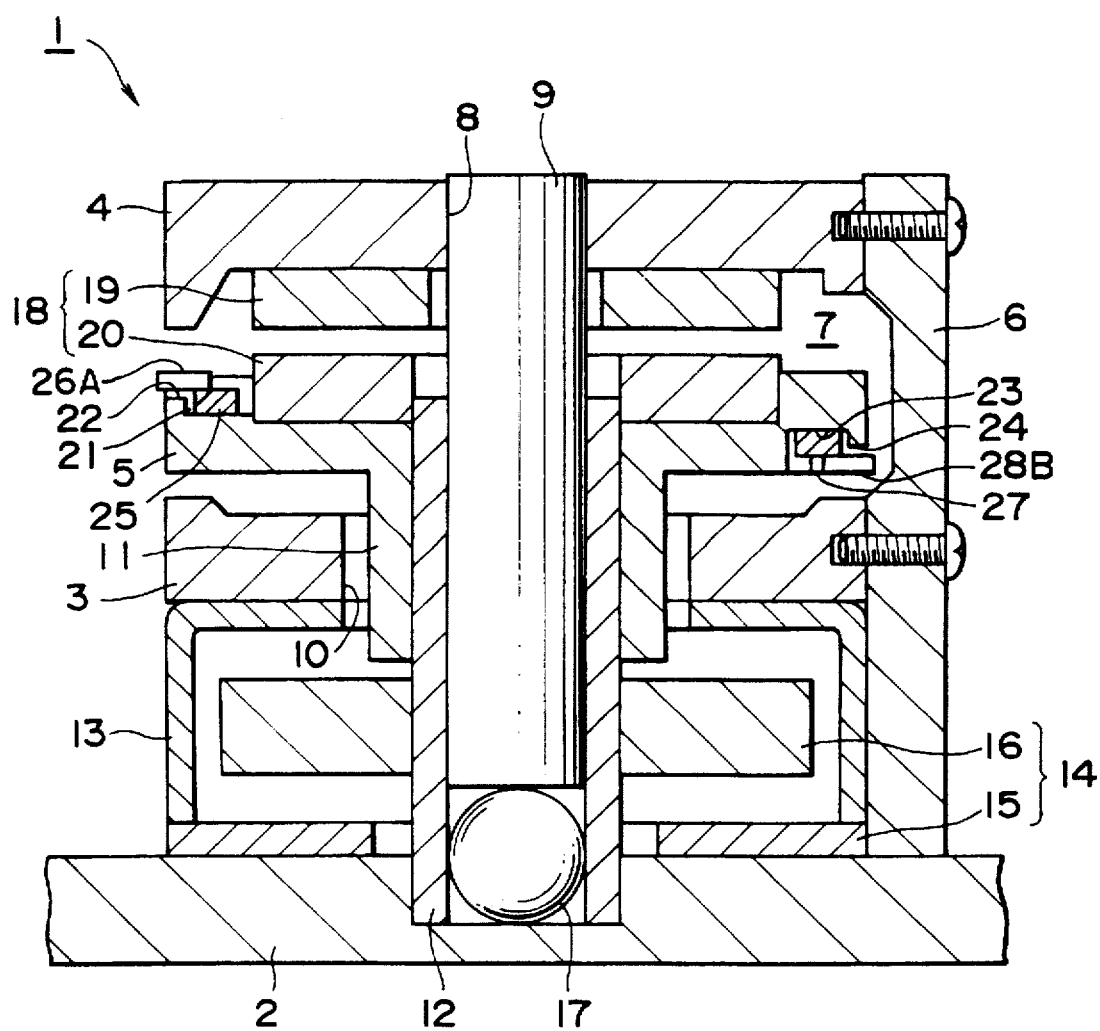
FIG. 3 is a vertical sectional view for illustrating the structure of a rotary head device in accordance with the first embodiment of the present invention.
Figure 4:
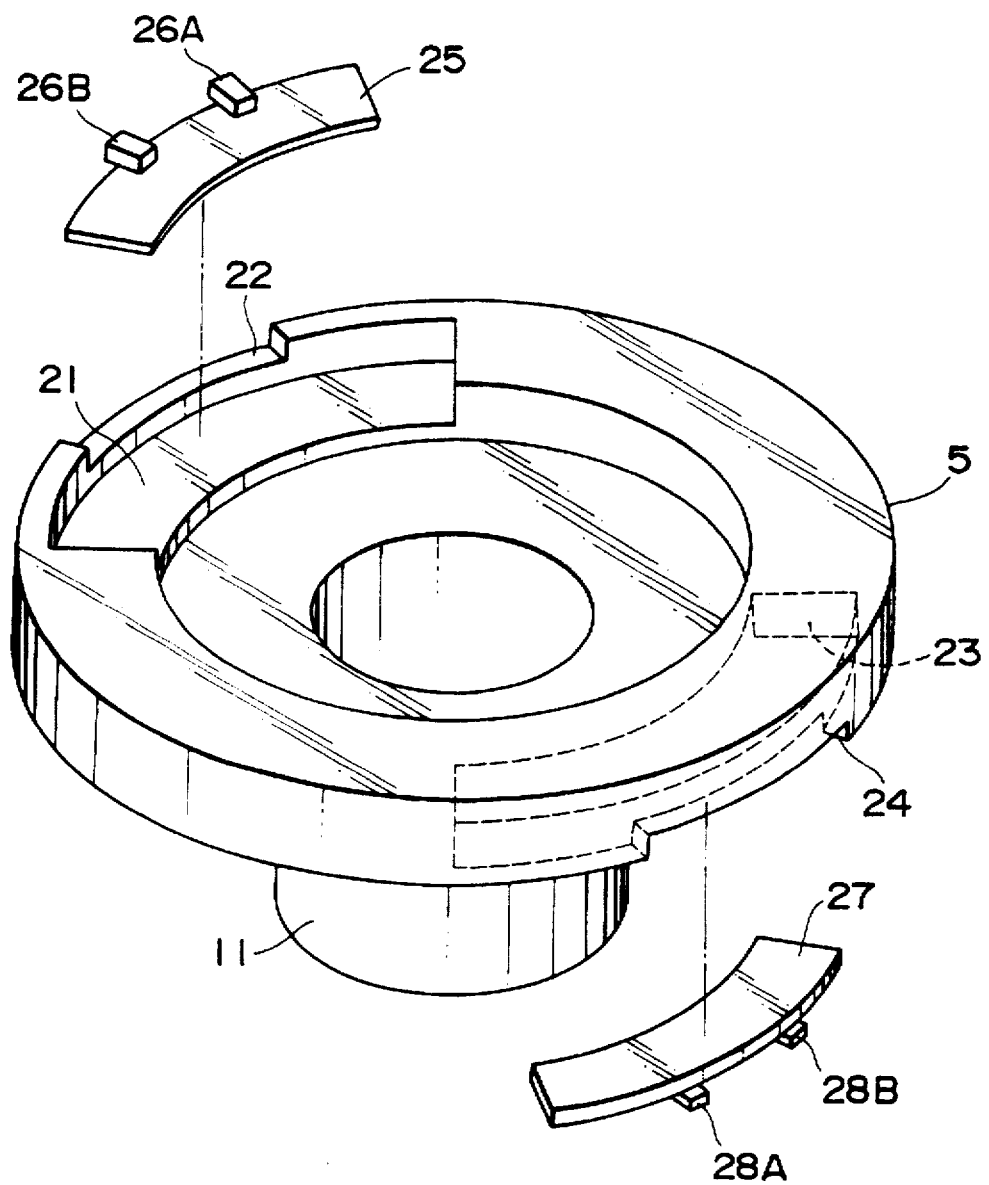
FIG. 4 is an exploded perspective view for illustrating the rotation drum of a rotary head device in accordance with the first embodiment.

First, the rotary head device in accordance with the first embodiment is de scribed referring to FIGS. 3 and 4.

The rotary head device is provided on a chassis 2, and provided with a bottom drum 3 and top drum 4 fixed to the chassis 2, and a rotation drum 5 provided between fixed drums 3 and 4. A tape cassette is attached on the recorder and/or regenerator, thereby, the chassis 2 is moved and the rotary head device 1 is placed in the tape cassette from the opening on the front side of the tape cassette. As the result, the magnetic tape is wound around the rotary head device 1. A column 6 stands on the chassis 2, the bottom drum 3 and top drum 4 are fixed to the column 6 by screwing. The bottom drum 3 and top drum 4 have a circular peripheral surface with the exception of portions for fixing the drum to the column 6. A space 7 is provided between the bottom drum 3 and the top drum 4. The space 7 is a space for allowing the rotation of the rotation drum 5.

In a supporting hole 8 formed at the center of the top drum 4, the top end of a supporting shaft 9 is fixed by pressing. The bottom end of the supporting shaft 9 extends under the bottom drum 3 through a insertion hole 10 formed on the bottom drum 3.

A tube 11 is formed projectedly downward solidly with the center of the rotation drum 5. The top of the bearing sleeve 12 is press-fitted to the tube 11. The bottom of the bearing sleeve 12 extend downward beyond the bottom end of the tube 11.

On the bottom end of a sealed case 13 fixed to the bottom side of the bottom drum 3 and open on the bottom side, a stator 15 of a flat opposing motor 14 is fixed, and the rotor 16 of the motor 14 is fixed to the bottom of the bearing sleeve 12.

The supporting shaft 9 is inserted in the bearing sleeve 12, and the middle drum 5 is supported by the top drum 4. In FIG. 3, an identification numeral 17 represents a thrust bearing press-inserted in the bottom of the bearing sleeve 12, the bottom end of the supporting shaft 9 is maintained in contact with the thrust bearing 17 by suction force generated between a magnet, not shown in the figure and supported by the above-mentioned rotor 16, and sealed cased 13. When a driving current is supplied to the coil of the stator 15 of the motor 14, the motor 14 is rotationally driven by alternating magnetic field from the coil of the stator 15 and dc magnetic field from a magnet which is a component of the rotor 16. The stator 19 of the rotary transformer 18 is fixed on the bottom side of the top drum 4, the rotor 20 is fixed on the top side of the middle drum 5 so as to face with the stator 19. The magnetic head, which will be described hereinafter, is connected to the recording and/or regenerating circuit of the recorder and/or regenerator through this rotary transformer 18.

On the top side of the rotation drum 5, a recess 21 is formed, and on a part of peripheral wall which defines the out side of the recess 21, a cut 22 is formed. At the opposite side of the part of the bottom side of the rotation drum 5 where the recess 21 is formed, namely at the position apart 180 degrees in the peripheral direction of the rotation drum 5, a recess 23 is formed, a cut 24 is formed on the part of the peripheral wall which defines the out side of the recess 23. A head base plate 25 is provided in the recess 21 on the top side of the rotation drum 5. Magnetic heads 26A and 26B are mounted on the top side of the first head base plate 21. The magnetic heads 26A and 26B (referred to as A-side head hereinafter) are served for recording and/or regeneration on and/or from one recording region (referred to as A-side hereinafter) of the two recording regions divided along the longitudinal direction of a magnetic tape. In the rotary head device 1, each of the two recording region is served to two channel recording and/or regeneration, the magnetic head 26A is for one channel (referred to as A-channel hereinafter) and the magnetic head 26B is for the other channel (referred to as B-channel hereinafter). The magnetic head 26A and magnetic head 26B is provided on the base plate 21 with a phase difference of 9.17 degrees in the peripheral direction of the rotation drum 5. The magnetic heads 26A and 26B are provided on one side of the first head base plate 25 so as to be exposed from the cut 22 to the outside.

In the recess 23 on the bottom side of the rotation drum 5, the second head base plate 27 is provided, and on the bottom side of the second head base plate 27, magnetic heads 28A and 28B are provided with a phase difference of 180 degrees from the magnetic heads 26A and 26B, in other words, at the position opposing 180 degrees to the magnetic heads 26A and 26B. The magnetic heads 28A and 28B are served to record on and/or regenerate from the other recording region (referred to as B-side hereinafter) of the two recording regions divided along the longitudinal direction of the magnetic tape. The magnetic head 28A is for A-channel head, and the magnetic head 28B is for B-channel head. The magnetic heads 28A and 28B is provided on one side of the second base plate 27 so as to be exposed from the cut 24 to the outside. The magnetic heads 28A and 28B are provided on the second base plate 27 with a phase difference of 9.17 degrees as same as the magnetic heads 26A and 26B.

In the rotary head device 1, a magnetic tape is recorded and/or regenerated separately on A-side and B-side recording regions divided along the longitudinal direction of the magnetic tape not shown in the figure by A-side heads 26A and 26B and B-side heads 28A and 28B respectively. Therefore, after one region, for example A-side of the magnetic tape, is used for recording and/or regeneration, successively, the other region, namely B-side of the magnetic tape, can be used for recording of input signals and/or regeneration of stored signals without troublesome interrupting operations that the tape is re-wound, or the tape cassette is taken out from the device and re-attached on the device placing the reversed side of the tape cassette on the other side. It is possible to record and/or regenerate on both A-side and B-side simultaneously.

The A-side heads 26A and 26B are provided with angular difference of 180 degrees apart from the B-side heads 28A and 28B in the peripheral direction, therefore, the vertical space can be prescribed as desired. The A-side heads can be positioned near the B-side heads in the height direction, the rotary head 1 can be minimized, therefore, the rotary head device can be used for recorders and/or regenerators which utilize a magnetic tape with a narrow width.

In the embodiment, the offset angle in the peripheral direction between the A-side heads 26A and 26B and B-side heads 28A and 28B is not limited to 180 degrees described herein above, and may be 90 degrees or any angle as long as the A-side heads 26A and 26B is positioned near the B-side heads 28A and 28B in the height direction.

Mounting of A-channel heads 26A and 28A and B-channel heads 26B and 28B on the same head base plates 25 and 27 allows the A-channel head and B-channel heads to be mounted at more precise position comparing with mounting on separate base plates, and results in efficient mounting work.

Figure 5:
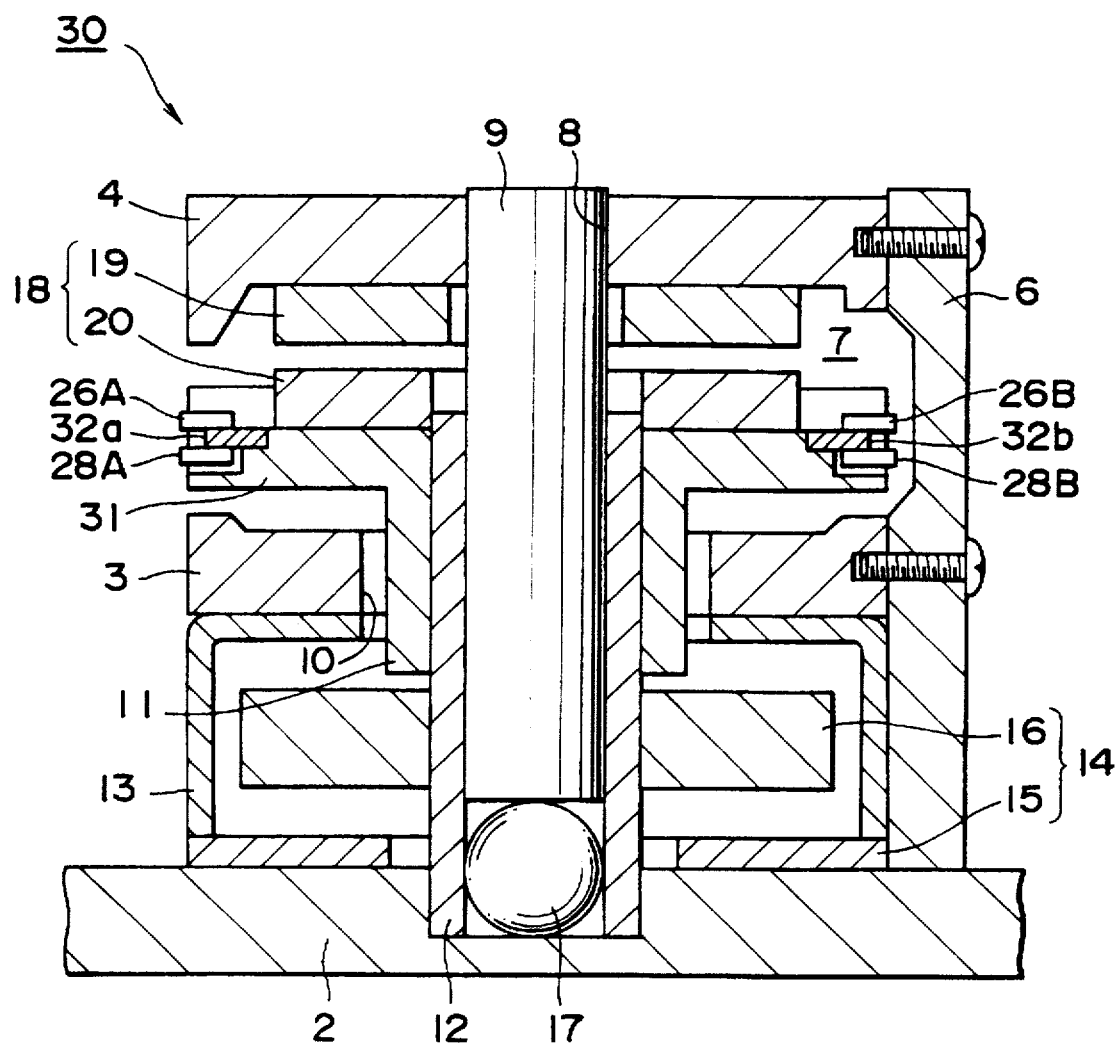
FIG. 5 is a vertical cross-sectional view for illustrating the structure of a rotary head device in accordance with the second embodiment of the present invention.
Figure 6:
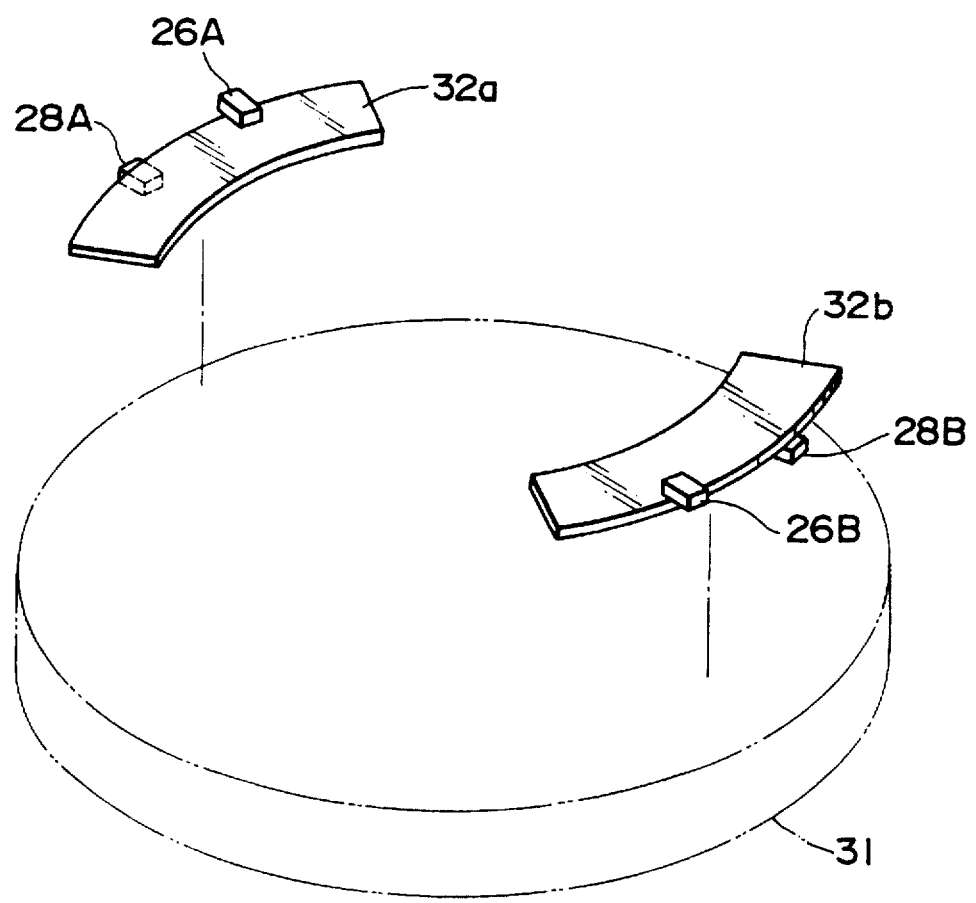
FIG. 6 is an exploded perspective view for illustrating the structure of the main part of the rotary head device in accordance with the second embodiment.

Next, a rotary head device in accordance with the second embodiment of the present invention is described referring to FIGS. 5 and 6.

The second embodiment has the same structure as the first embodiment described herein above with the exception of the arrangement of magnetic heads. The structure different from the first embodiment is described in detail, and the same character is given to the same member of the second embodiment which correspond to the member of the first embodiment, and detailed description of the member is omitted.

Two head base plates 32a and 32b are mounted apart each other 180 degrees in the peripheral direction of the rotation drum 31 of the rotary head device 30 in accordance with the second embodiment. A-side A-channel head 26A is mounted on the top side of the head base plate 32a and B-side A-channel head 28A is mounted on the bottom side of the head base plate 32a. A-side B-channel head 26B is mounted on the top side of the head base plate 32b and B-side B-channel head 28B is mounted on the bottom side of the head base plate 32b. In FIG. 5, A-side heads 26A and 26B and B-side heads 28A and 28B are shown as if the heads are facing each other vertically with interposition of the head base plates, however actually, as shown in FIG. 6, the magnetic head 26A is provided apart from the magnetic head 28A angularly in the peripheral direction of the rotation drum 31, and similarly the magnetic head 26B is provided apart from the magnetic head 28B.

As described herein above, A-side heads and B-side heads are provided on the same head base plate, thereby, A-side heads and B-side heads can be relatively positioned more precisely, the precise positioning is the advantage of this method. In the second embodiment, A-side heads and B-side heads are provided near each other in the height direction as described in the first embodiment.

In the embodiments described hereinbefore, the rotary head device is described referring to devices for recording and/or regenerating digital audio signals, however, the rotary head device is also applied to devices for recording and/or regenerating image signals in addition to audio signals. Various modifications are applied to the invention without departing from the scope of the invention.

What is claimed is:

1. A rotary head device, said rotary head device being for recording signals on a tape recording medium and for regenerating recorded signals from said tape recording medium, said tape recording medium being divided into two recording regions along a longitudinal direction of said tape recording medium, said rotary head device forming a plurality of inclined tracks parallel each other along the longitudinal direction of each recording region of the tape recording medium during recording, said rotary head device comprising:

a rotation drum on which the tape recording medium is wound;

rotationally driving means for rotationally driving said rotation drum;

a first head component mounted on said rotation drum and including a first pair of heads arranged next to each other and being substantially coplanar, said first pair of heads being for recording signals on a first region of the two recording regions of said tape recording medium and for regenerating recorded signals from said first region; and a second head component mounted on said rotation drum and including a second pair of heads arranged next to each other and being substantially coplanar at a height position different from a height position of said first head component and at a position angularly apart by at least 90° in the peripheral direction of said rotation drum from said first head component, said second pair of heads being for recording signals on a second region of the two recording regions of said tape recording medium and for regenerating recorded signals from said second region; wherein said device further comprises a first base plate for attachment to said rotation drum and on which said first pair of heads is mounted and a second base plate for attachment to said rotation drum and on which said second pair of heads is mounted, said rotation drum having a first recess for mounting said first base plate on one flat surface of said rotation drum and a second recess for mounting said second base plate on another flat surface of said rotation drum at said position angularly apart by at least 90° in the peripheral direction of said rotation drum from said first base plate.

2. The rotary head device as claimed in claim 1, wherein said first head component and said second head component are positioned 180 degrees symmetrically with each other about the center of rotation of said rotation drum.

3. The rotary head device as claimed in claim 1, wherein said first head component has the first head for the first channel and the second head for the second channel, and said second head component has the third head for the first channel and the fourth head for the second channel.

4. The rotary head device as claimed in claim 2, wherein said first pair of heads includes a first head and a second head positioned on the same side of said first base plate at different positions apart from each other by substantially 9° in the peripheral direction of said rotation drum, and said second pair of heads includes a third head and a fourth head positioned on the same side of said second base plate at different positions apart from each other by substantially 9° in the peripheral direction of said rotation drum.

5. The rotary head device as claimed in claim 3, wherein any one of said first head and said third head provided on one side of said first base plate, the other head is provided on the other side of said first base plate, and any one of said second head and said fourth head is provided on one side of said second base plate and the other head is provided on the other side of said second base plate.

6. The rotary head device as claimed in claim 5, wherein said first head and said third head are provided with interposition of said first base plate at the angularly different positions of each other in the peripheral direction of said rotation drum, and said second head and said fourth head are provided with interposition of said second base plate at the angularly different position each other in the peripheral direction of said rotation drum.

7. A rotary head device, said rotary head device being for recording signals on a tape recording medium and for regenerating recorded signals from said tape recording medium, said tape recording medium being divided into two recording regions along a longitudinal direction of said tape recording medium, said rotary head device forming a plurality of inclined tracks parallel each other along the longitudinal direction of each recording region of the tape recording medium during recording, said rotary head device comprising:

a rotation drum on which the tape recording medium is wound;

rotationally driving means for rotationally driving said rotation drum;

a first head component mounted on said rotation drum and including first and second heads being adjacently arranged with said first head being at a first height position and said second head being at a second height position different than said first height position, said first head being for recording signals on and for regenerating recorded signals from a first region of said two recording regions and said second head being for recording signals on and for regenerating recorded signals from a second region of said two recording regions;

a second head component mounted on said rotation drum substantially diametrically opposite from said first head component and including third and fourth heads being adjacently arranged with said third head being at said first height and said fourth head being at said second height, said third head being for recording signals on and for regenerating recorded signals from said first region and said fourth head being for recording signals on and for regenerating recorded signals from said second region of said two tape recording regions of said recording medium;

a first base plate for attachment to said rotation drum on which said first and second heads are mounted and a second base plate for attachment to said rotation drum on which said third and fourth heads are mounted; and said rotation drum having a first recess formed on one flat surface for mounting said first base plate and a second recess formed on one flat surface for mounting said second base plate, wherein said first head is mounted on a first side of said first base plate and said second head is mounted on a second, opposite side of said first base plate and said third head is mounted on a first side of said second base plate and said fourth head is mounted on a second, opposite side of said second base plate.

8. The rotary head device as claimed in claim 7, wherein said first and second heads are spaced apart from each other in a peripheral direction by substantially 9° and said third and fourth heads are spaced-apart from each other in the peripheral direction by substantially 9°.

* * * * *